United States Patent
Ishihara et al.

(10) Patent No.: US 10,983,004 B2
(45) Date of Patent: Apr. 20, 2021

(54) SPECTRUM CORRECTION DEVICE, SPECTRUM CORRECTION METHOD, AND NON-TRANSITORY COMPUTER READABLE STORAGE MEDIUM

(71) Applicants: Yokogawa Electric Corporation, Tokyo (JP); Yokogawa Test & Measurement Corporation, Tokyo (JP)

(72) Inventors: Gentaro Ishihara, Tokyo (JP); Manabu Kojima, Tokyo (JP)

(73) Assignees: Yokogawa Electric Corporation, Tokyo (JP); YOKOGAWA TEST & MEASUREMENT CORPORATION, Tokyo (JP)

(*) Notice: Subject to any disclaimer, the term of this patent is extended or adjusted under 35 U.S.C. 154(b) by 102 days.

(21) Appl. No.: 16/383,793

(22) Filed: Apr. 15, 2019

(65) Prior Publication Data

US 2019/0323887 A1 Oct. 24, 2019

(30) Foreign Application Priority Data

Apr. 23, 2018 (JP) .............................. JP2018-082650

(51) Int. Cl.
*G01J 3/02* (2006.01)
*G01J 3/28* (2006.01)

(52) U.S. Cl.
CPC ........... *G01J 3/0297* (2013.01); *G01J 3/2803* (2013.01)

(58) Field of Classification Search
CPC .......... G01J 3/0297; G01J 3/2803; G01J 3/28; G01J 3/02; G01J 3/00; G01D 18/00
See application file for complete search history.

(56) References Cited

U.S. PATENT DOCUMENTS

| 5,923,420 | A | 7/1999 | Iwasaki | |
|---|---|---|---|---|
| 2014/0104614 | A1* | 4/2014 | Rokitski | G03F 7/7085 356/402 |

FOREIGN PATENT DOCUMENTS

| JP | 59-013922 A | 1/1984 |
|---|---|---|
| JP | 2001-099710 A | 4/2001 |
| JP | 3189162 B2 | 7/2001 |
| JP | 2009-180679 A | 8/2009 |
| JP | 2015-049168 A | 3/2015 |

* cited by examiner

*Primary Examiner* — Abdullahi Nur
(74) *Attorney, Agent, or Firm* — Sughrue Mion, PLLC

(57) ABSTRACT

A spectrum correction device includes an analyzer configured to analyze a shape of an optical spectrum obtained by measuring a light to be measured using spectrum data representing the optical spectrum, a corrector configured to perform a correction process according to the shape of the optical spectrum to the spectrum data based on an analysis result of the analyzer, and a synthesizer configured to synthesize the spectrum data corrected by the corrector.

19 Claims, 9 Drawing Sheets

SPECTRUM CORRECTION DEVICE, SPECTRUM CORRECTION METHOD, AND NON-TRANSITORY COMPUTER READABLE STORAGE MEDIUM

BACKGROUND

Technical Fields

The present invention relates to a spectrum correction device, a spectrum correction method and a non-transitory computer readable storage medium.

Priority is claimed on Japanese Patent Application No. 2018-082650, filed on Apr. 23, 2018, the contents of which are incorporated herein by reference.

Related Art

Intensity characteristics (optical spectrum) of light to be measured for respective wavelengths or frequencies are measured using an optical spectrum analyzer in many cases. This optical spectrum analyzer is a device that includes a spectroscope that disperses light to be measured, a light detector that detects the light dispersed by the spectroscope and a processing device that performs signal processing on a detection signal output from the light detector to obtain an optical spectrum, for example, and displays a 2-dimensional graph having the horizontal axis representing wavelength or frequency and the vertical axis representing intensity (power).

Japanese Patent No. 3189162 discloses an example of a conventional optical spectrum analyzer. Specifically, an optical spectrum analyzer that can obtain an accurate optical spectrum in an arbitrarily determined wavelength bandwidth (wavelength resolution) even in cases in which the width of an emission slit of a spectroscope cannot be arbitrarily changed and the like is disclosed. This optical spectrum analyzer performs a correction process of simple-moving-averaging (moving adding up) a light intensity measurement value P(i) at each measurement point i of the measured optical spectrum in the arbitrarily determined wavelength bandwidth (wavelength resolution). Since the wavelength resolution of the spectroscope is corrected by performing such a correction process, it is possible to obtain an accurate optical spectrum in an arbitrarily determined wavelength bandwidth (wavelength resolution).

Incidentally, the aforementioned optical spectrum analyzer disclosed in Japanese Patent No. 3189162 can obtain an accurate optical spectrum in an arbitrarily determined wavelength bandwidth (wavelength resolution) in many cases by performing the aforementioned correction process. However, there is a problem that an accurate optical spectrum may not be able to be obtained when the aforementioned correction process is performed in specific cases (e.g., a case in which the wavelength bandwidth of light to be measured is narrower than a measurement wavelength resolution as in a main mode of a distributed feed-back (DFB) laser).

SUMMARY

To solve these problems, a spectrum correction device according to one aspect of the present invention may include an analyzer configured to analyze a shape of an optical spectrum obtained by measuring a light to be measured using spectrum data representing the optical spectrum, a corrector configured to perform a correction process according to the shape of the optical spectrum to the spectrum data based on an analysis result of the analyzer, and a synthesizer configured to synthesize the spectrum data corrected by the corrector.

Further features and aspects of the present disclosure will become apparent from the following detailed description of exemplary embodiments with reference to the attached drawings.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a spectrum correction device, a spectrum correction method and a non-transitory computer readable storage medium capable of obtaining a more accurate optical spectrum than a conventional one.

Hereinafter, a spectrum correction device, a spectrum correction method and a non-transitory computer readable storage medium according to embodiments of the present invention will be described with reference to the drawings. In the following, the overview of the present embodiment will be described first and then each embodiment will be described in detail.

[Overview]

Embodiments of the present invention allow a more accurate optical spectrum than a conventional one to be obtained. Specifically, embodiments of the present invention allow a more accurate optical spectrum than a conventional one to be obtained by solving the following two problems generated in a conventional optical spectrum analyzer when the wavelength bandwidth of light to be measured is narrower than a measurement wavelength resolution.

[Problem 1] The top portion of peak portions of an optical spectrum after correction may be rounded and the peak portions may be widened overall to lead to lack of sharpness in the optical spectrum, resulting in deterioration in a vicinal dynamic range (capability of separately measuring other peak portions adjacent to a certain peak portion of an optical spectrum) of the optical spectrum.

[Problem 2] The peak power of the optical spectrum before correction differs from that after correction.

Figure 8A:
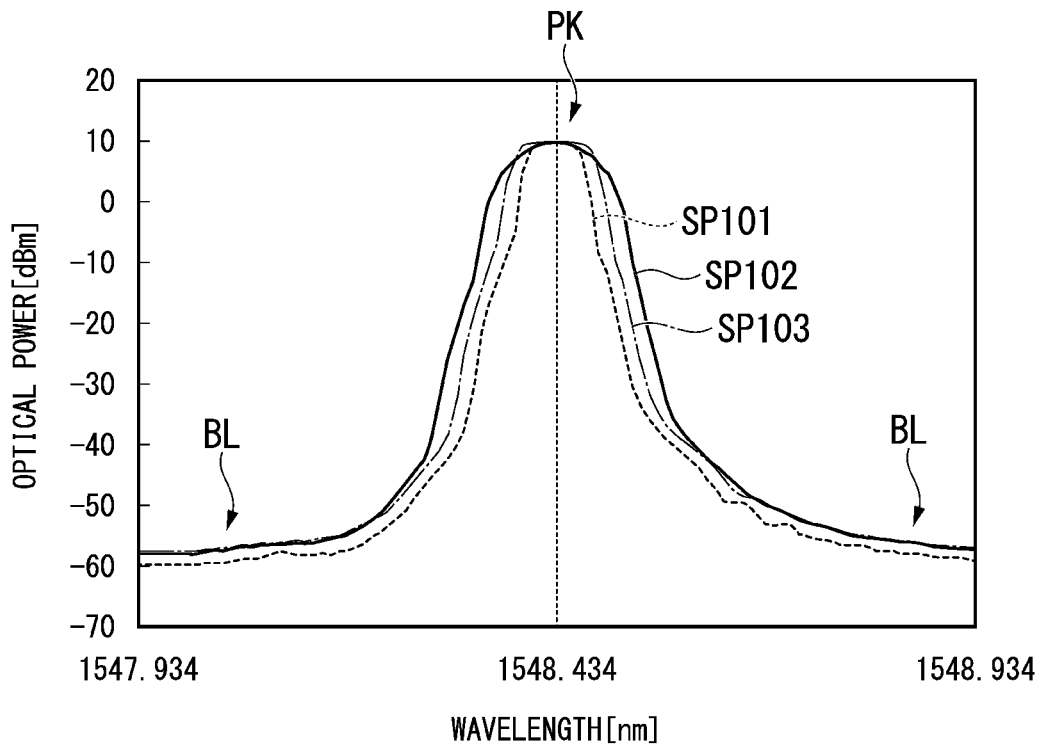
FIG. 8A is a diagram for describing problem 1 generated in a conventional optical spectrum analyzer.
Figure 8B:
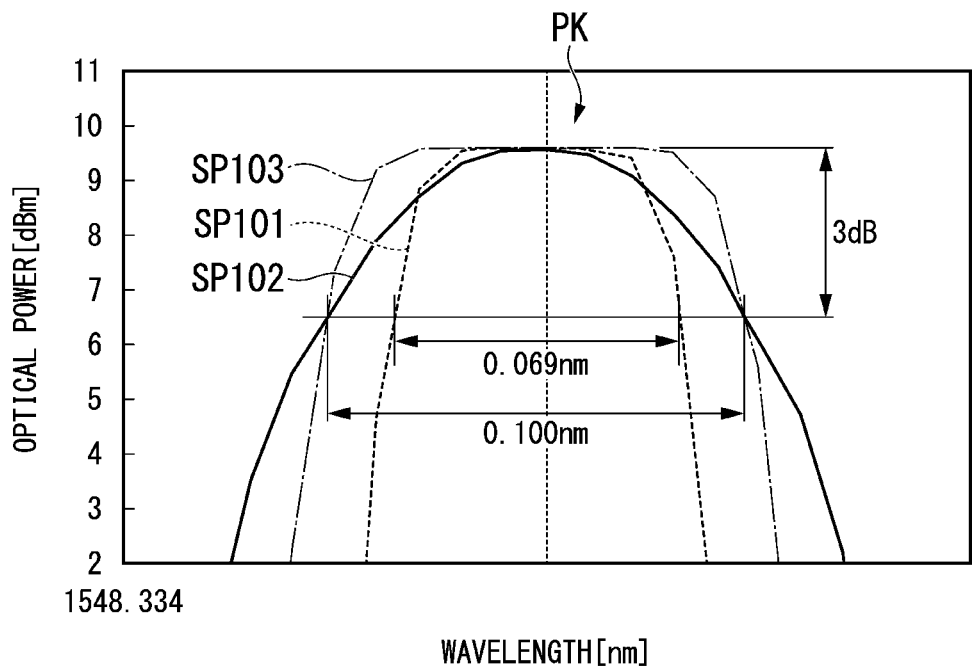
FIG. 8B is a diagram for describing problem 1 generated in a conventional optical spectrum analyzer.

FIG. 8A and FIG. 8B are diagrams for describing the problem 1 generated in a conventional optical spectrum analyzer. FIG. 8A is a diagram enlarging and showing one peak portion of optical spectra and FIG. 8B is a diagram further enlarging the peak portion shown in FIG. 8A. Optical spectra SP101 to SP103 shown in FIG. 8A and FIG. 8B are obtained by measuring a laser beam emitted from a DFB laser light source having a wavelength of 1548.434 and an optical power of approximately 10 dBm.

The optical spectrum SP101 is obtained by measuring the laser beam using a spectroscope having a wavelength resolution set to 0.069 nm. The optical spectrum SP102 is obtained by correcting spectrum data representing the optical spectrum SP101 using a conventional technique such that the wavelength resolution becomes 0.1 nm. The optical spectrum SP103 is acquired by measuring the laser beam using a spectroscope having a wavelength resolution set to 0.1 nm.

In general, a wavelength resolution of a spectroscope is represented as a width (full width at half maximum) at a portion 3 dB below a peak (top portion) of an optical spectrum obtained by measuring a single-wavelength light source. Referring to FIG. 8B which enlarges a peak portion PK of the optical spectra shown in FIG. 8A, it can be ascertained that the wavelength resolution of the optical spectrum SP101 is 0.069 nm that is the same as the wavelength resolution set in the spectroscope. In addition, it can be ascertained that the wavelength resolution of the optical spectrum SP102 is 0.1 nm that is a wavelength resolution which has been corrected. Further, it can be ascertained that the wavelength resolution of the optical spectrum SP103 is 0.1 nm that is the same as the wavelength resolution set in the spectroscope. That is, it can be ascertained that the wavelength resolution is corrected to a desired wavelength resolution in the conventional technique with only the wavelength resolution being involved.

However, referring to the entire peak portion PK of the optical spectra as shown in FIG. 8A, it can be ascertained that the top shape of the peak portion PK of the optical spectrum SP102 after correction is rounded compared to the optical spectrum SP103 that is not corrected and the peak portion PK is widened overall to lead to lack of sharpness in the optical spectrum. Furthermore, it can be ascertained that correction has been correctly performed with respect to baseline portions BL (low optical power portions between the peak portion PK and other peak portions that are not shown) of the optical spectra from the fact that the optical power of the optical spectrum SP102 after correction is higher than the optical power of the optical spectrum SP101 before correction by 1.6 dB (about 45%) and is consistent with a ratio (0.1/0.069=1.449) of resolution before correction to resolution after correction.

Here, when the top shape of the peak portion PK in the optical spectra is rounded according to correction and thus a vicinal dynamic range of the optical spectra deteriorates, separate measurement of each laser beam may become unclear when optical spectra of a plurality of laser beams having adjacent wavelengths are measured. For example, when wavelength division multiplexing (WDM) signal light in which a plurality of laser beams having different wavelengths have been multiplexed is measured, a measurement wavelength resolution is set to be narrower than the wavelength interval of the WDM signal light such that a signal optical spectrum of each wavelength can be separately measured. However, when the vicinal dynamic range deteriorates, the optical spectrum of each laser beam may not be clearly separated.

Figure 9:
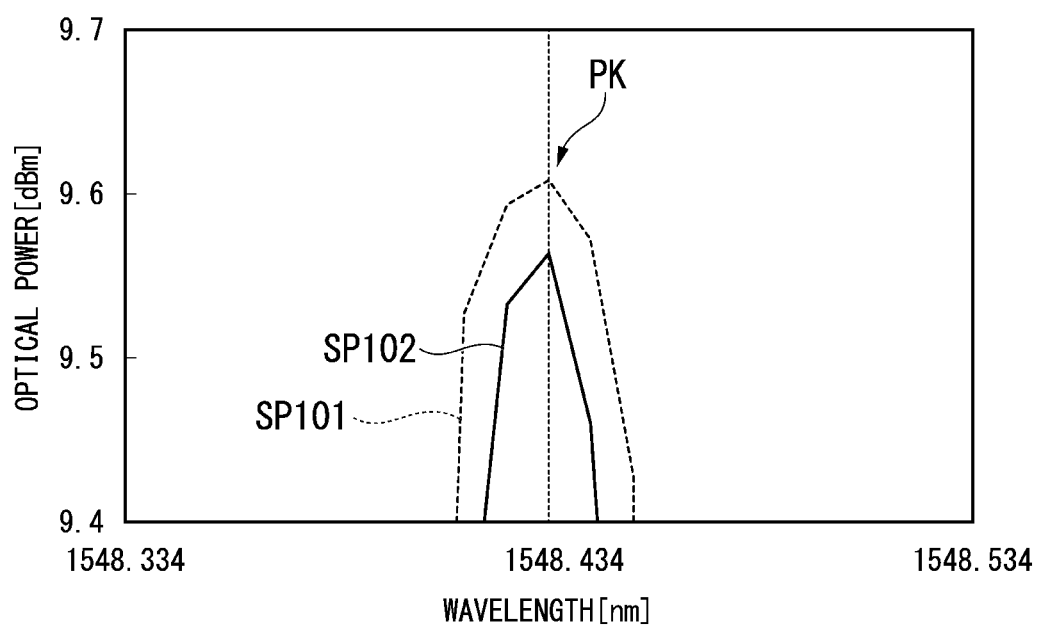
FIG. 9 is a diagram for describing problem 2 generated in the conventional optical spectrum analyzer.

FIG. 9 is a diagram for describing problem 2 generated in the conventional optical spectrum analyzer. Further, optical spectra SP101 and SP102 shown in FIG. 9 are obtained by enlarging the peak portions PK of the optical spectral SP101 and SP102 shown in FIG. 8. Referring to FIG. 9, it can be ascertained that the peak power of the optical spectrum SP102 after correction decreases by about 0.04 dB (about 0.9%) compared to the peak power of the optical spectrum SP101 before correction.

The aforementioned problems 1 and 2 are generated because spectrum data representing an optical spectrum is simple-moving-averaged in a wavelength width direction in an arbitrarily determined wavelength bandwidth (wavelength resolution) in the conventional technique. In embodiments of the present invention, a more accurate optical spectrum than a conventional one is obtained by minimizing change in shape (rounding and widening) of a peak portion PK of an optical spectrum after correction and causing the peak power of the optical spectrum before correction to be the same as that after correction.

First Embodiment

Figure 1:
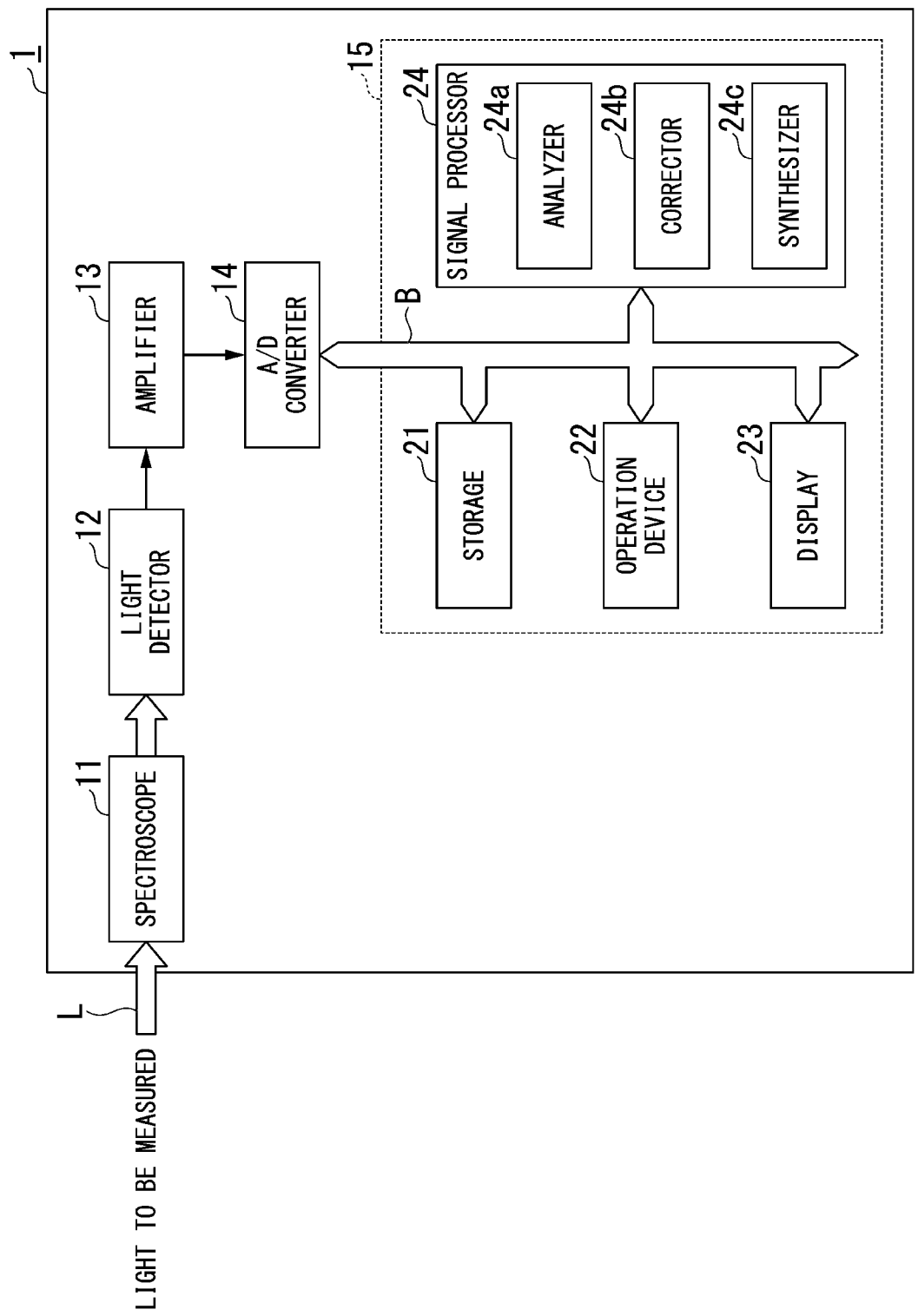
FIG. 1 is a diagram showing main components of an optical spectrum analyzer including a spectrum correction device according to a first embodiment of the present invention.

FIG. 1 is a diagram showing main components of an optical spectrum analyzer including a spectrum correction device according to a first embodiment of the present invention. As shown in FIG. 1, the optical spectrum analyzer 1 includes a spectroscope 11, a light detector 12, an amplifier 13, an A/D converter 14, and a signal processing device 15 (spectrum correction device) and performs processes of measuring optical spectra of light L to be measured input through an optical fiber which is not shown, for example, and correcting the measured optical spectra.

The spectroscope 11 disperses the input light L to be measured and outputs desired wavelength components among wavelength components included in the light L to be measured. For example, the spectroscope 11 operates to sequentially output wavelength components in a wavelength range set in advance among the wavelength components included in the light L to be measured. The light detector 12 detects the wavelength components output from the spectroscope 11 and outputs a signal (analog signal) indicating an optical power (intensity) of the detected wavelength components. As this light detector 12, for example, a photodiode can be used. The amplifier 13 amplifies the signal output from the light detector 12 with a prescribed amplification factor. The A/D converter 14 converts the signal (analog signal) amplified by the amplifier 13 into a digital signal and outputs the digital signal to the signal processing device 15.

The signal processing device 15 includes a storage 21, an operation device 22, a display 23 and a signal processor 24 connected to a bus B. The storage 21 stores various types of data, various parameters and various programs used in the signal processing device 15. For example, the storage 21 stores a digital signal (spectrum data) output from the A/D converter 14 and input through the bus B. In addition, the storage 21 stores programs for realizing functions (an analyzer 24a, a corrector 24b, a synthesizer 24c, and the like which will be described later) of the signal processor 24, for example. The storage 21 is composed of a hard disk drive (HDD), a solid state drive (SSD), a random access memory (RAM), a read only memory (ROM), or the like and performs input/output of various types of information under the control of the signal processor 24.

The operation device 22 includes various operation buttons such as function keys and numerical keys and a touch panel and outputs an instruction according to an operation of a user who uses the optical spectrum analyzer 1 to the signal processor 24. The display 23 includes a display device, for example, a liquid crystal display (LCD), a cathode ray tube (CRT) or the like, and displays various types of information output from the signal processor 24. For example, the display 23 displays an optical spectrum obtained by visualizing spectrum data. Meanwhile, the operation device 22 and the display 23 may be physically separated or may be physically integrated like in a touch panel type liquid crystal display having both a display function and an operation function.

The signal processor 24 generally controls operations of the optical spectrum analyzer 1 and performs various types of signal processing. For example, the signal processor 24 reads spectrum data stored in the storage 21 and performs signal processing for obtaining optical spectra of the light L to be measured. In addition, the signal processor 24 includes the analyzer 24a (analysis means), the corrector 24b (correction means), and a synthesizer 24c (synthesizing means) and performs signal processing for correcting optical spectra based on an instruction output from the operation device 22, for example.

The analyzer 24a performs an analysis process of analyzing shapes of optical spectra obtained by measuring the light L to be measured using spectrum data read from the storage 21, for example. The analyzer 24a performs a process of obtaining a slope in each wavelength of the spectrum data, a process of obtaining an inflection point of a slope of the spectrum data, a process of obtaining the amount of noise components superposed on the spectrum data, and other processes, for example, as the analysis process.

Here, spectrum data at a measurement point i (i is an integer equal to or larger than 1) is represented as P(i). Further, the unit of the spectrum data P(i) is W or dBm. In addition, a measurement wavelength resolution at the measurement point i of the spectrum data P(i) is represented as RB(i). The measurement wavelength resolution RB(i) indicates the wavelength resolution of the spectroscope 11 and is provided by being calculated in advance or defined as a constant. Further, the unit of the measurement wavelength resolution RB(i) is m. The analyzer 24a obtains an amount of change (slope amount S(i)) in optical power (optical intensity) per measurement wavelength resolution RB(i) of the spectrum data P(i) as the aforementioned slope, for example. Further, the unit of the slope amount S(i) is dB/RES.

The corrector 24b performs a correction process according to the shape of an optical spectrum to the spectrum data based on an analysis result of the analyzer 24a. Specifically, the corrector 24b performs the aforementioned correction process using a correction method selected from a plurality of correction methods prepared in advance in accordance with the shape of an optical spectrum based on an analysis result of the analyzer 24a. For example, a wavelength resolution correction method (first correction method) for correcting a wavelength resolution of an optical spectrum and a shape correction method (second correction method) for correcting the shape of an optical spectrum by expanding or contracting the optical spectrum in a wavelength axis direction or a frequency axis direction may be prepared in the corrector 24b, and the corrector 24b may select the wavelength resolution correction method or the shape correction method in accordance with slopes of optical spectra determined by the analyzer 24a to perform the aforementioned correction process.

Here, the corrector 24b may select the wavelength resolution correction method or the shape correction method using a threshold value Sth set in accordance with characteristics of the spectroscope 11 used for measurement of the light L to be measured in selection of the wavelength resolution correction method or the shape correction method. For example, the wavelength resolution correction method may be selected to perform the correction process for a portion where the absolute value of a slope of an optical spectrum is equal to or less than the threshold value Sth and the shape correction method may be selected to perform the correction process for a portion where the absolute value of the slope of the optical spectrum is greater than the threshold value Sth.

The synthesizer 24c synthesizes spectrum data corrected by the corrector 24b.

Specifically, the synthesizer 24c synthesizes the spectrum data corrected by the corrector 24b such that a discontinuity does not occur in a synthesized optical spectrum. For example, the synthesizer 24c may process the spectrum data corrected by the corrector 24b partially in an optical power axis direction such that a discontinuity does not occur.

Functions (the analyzer 24a, the corrector 24b and the synthesizer 24c) of the signal processor 24 are realized as software by executing programs stored in the storage 21. That is, each function of the signal processor 24 is realized by software and hardware resources in cooperation. Further, a program for realizing each function of the signal processor 24 may be distributed in a state in which it has been recorded in a computer readable recording medium such as a CD-ROM, DVD (registered trademark)-ROM or a universal serial bus (USB) memory or may be distributed through a network such as the Internet.

Figure 2:
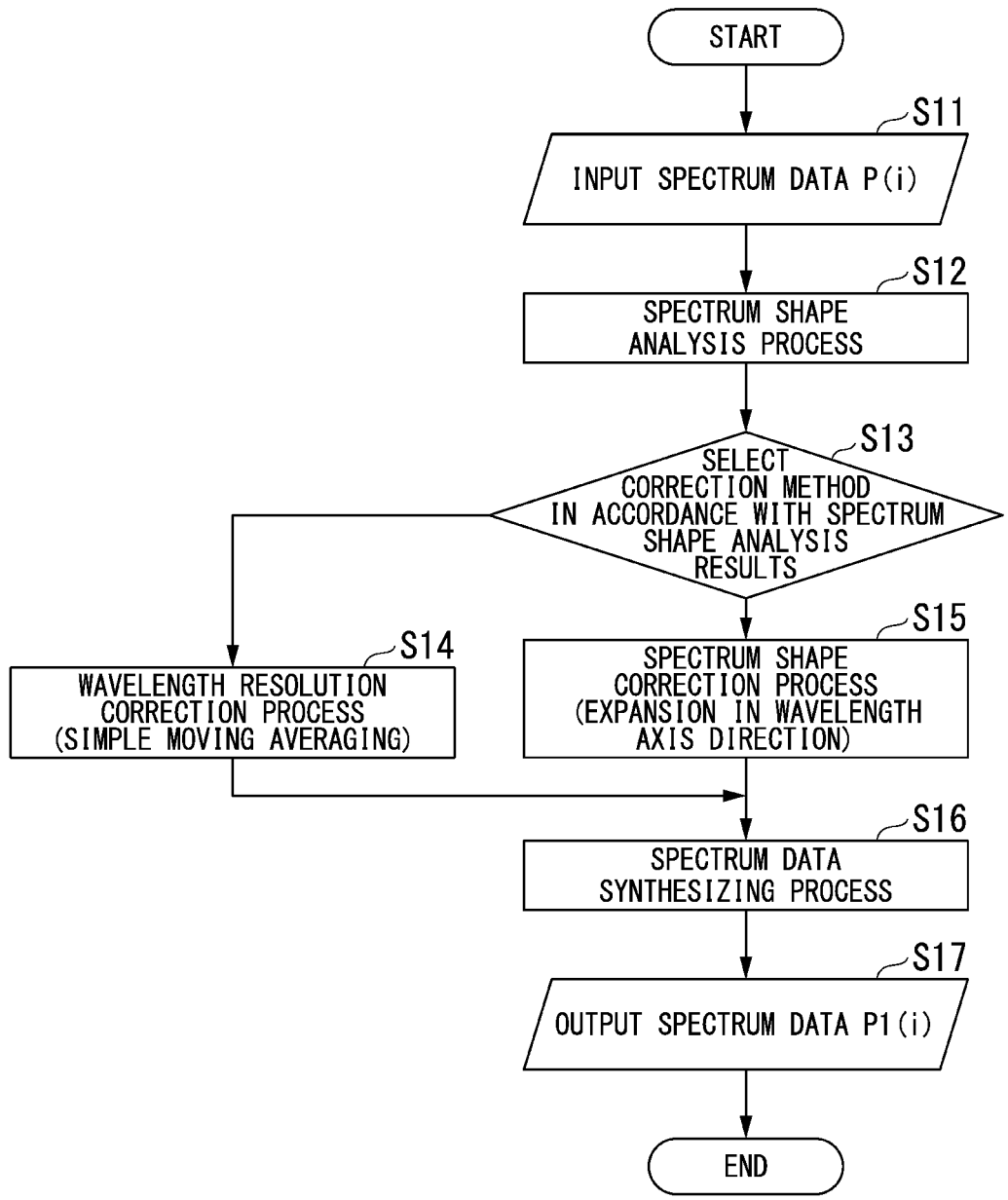
FIG. 2 is a flowchart showing a spectrum correction method according to the first embodiment of the present invention.

FIG. 2 is a flowchart showing a spectrum correction method according to the first embodiment of the present invention. The flowchart shown in FIG. 2 starts when a spectrum correction instruction is issued according to a user operation through the operation device 22 or when new spectrum data has been acquired through optical spectrum measurement in a state in which execution of spectrum correction has been set in advance, for example.

When the procedure of the flowchart shown in FIG. 2 starts, the signal processor 24 performs a process of inputting spectrum data P(i) (step S11). For example, the signal processor 24 performs a process of reading the spectrum data P(i) stored in the storage 21 and inputting the spectrum data P(i) to the analyzer 24a. Meanwhile, the number of pieces of spectrum data P(i) (the number of pieces of data) input in this process is about hundreds to tens of thousands, for example. Subsequently, the analyzer 24a performs a process of analyzing shapes of optical spectra using the spectrum data P(i) input in step S11 (step S12: analysis step).

For example, the analyzer 24a performs a process of obtaining a slope amount S(i) that is an amount of change in optical power per measurement wavelength resolution RB(i) of the spectrum data P(i). Further, the analyzer 24a may perform a process of obtaining an inflection point of a slope of the spectrum data P(i) and a process of obtaining an amount of noise components superposed on the spectrum data P(i) along with or instead of the process of obtaining the slope amount S(i).

Figure 3:
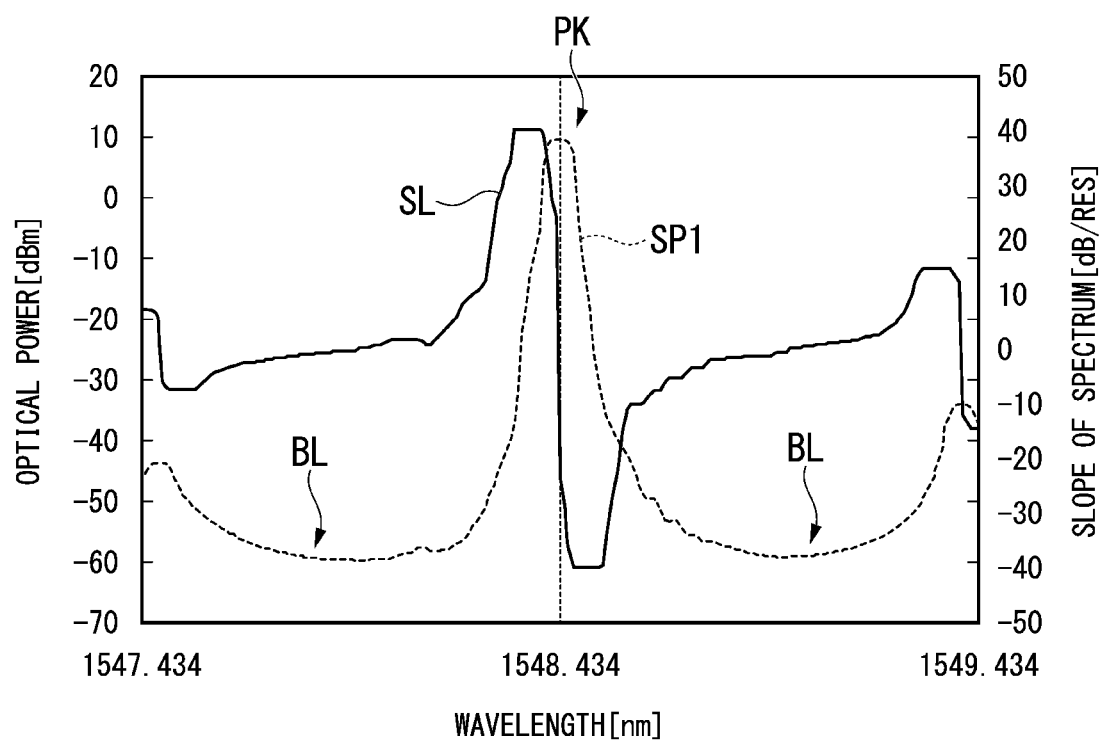
FIG. 3 is a diagram showing an example of an optical spectrum shape analysis result in the first embodiment of the present invention.

FIG. 3 is a diagram showing an example of an optical spectrum shape analysis result in the first embodiment of the present invention. An optical spectrum SP1 shown in FIG. 3 is obtained by measuring a laser beam emitted from a DFB laser light source having a wavelength of 1548.434 nm and optical power of about 10 dBm using the spectroscope 11 having a wavelength resolution set to 0.069 nm. Further, the optical spectrum SP1 is the same as the optical spectrum SP101 shown in FIG. 8A.

A slope SL shown in FIG. 3 indicates the slope amount S(i) of the optical spectrum SP1. Referring to FIG. 3, it can be ascertained that the absolute value of the slope of the optical spectrum SP1 is equal to or less than approximately 5 dB/RES with respect to baseline portions BL of the optical spectrum SP1. On the other hand, it can be ascertained that the absolute value of the slope of the optical spectrum SP1 exceeds about 5 dB/RES with respect to a peak portion PK of the optical spectrum SP1 and may exceed 40 dB/RES. In addition, it can be ascertained that there is a portion where the sign (positive or negative) of a slope of the optical spectrum SP1 is reversed in the peak portion PK of the optical spectrum SP1.

Further, a gentle slope portion (for example, the base line portion BL) of the optical spectrum SP1 is an optical spectrum of light having a wider wavelength bandwidth than the wavelength resolution of the spectroscope 11. On the other hand, a steep slope portion (for example, the peak portion PK) of the optical spectrum SP1 is an optical spectrum of light having a narrower wavelength bandwidth than the wavelength resolution of the spectroscope 11. In this manner, it is possible to determine whether the wavelength bandwidth of light to be measured is wider or narrower than the wavelength resolution of the spectroscope 11 from the slope of the optical spectrum SP1 for each portion of the optical spectrum SP1.

Subsequently, the corrector 24b performs a process of selecting a correction method in accordance with spectrum shape analysis results (step S13). For example, the corrector 24b performs a process of comparing a slope amount S(i) at each measurement point i with the threshold value Sth (threshold value set in accordance with characteristics of the spectroscope 11 used for measurement of the light L to be measured) and selecting a correction method described below according to the comparison result.

When $S(i) \leq Sth$:
the wavelength resolution correction method for correcting the wavelength resolution of the optical spectrum SP1 is selected.

When $Sth < S(i)$:
the shape selection method for correcting the shape of the optical spectrum SP1 is selected.

Subsequently, the corrector 24b performs a process of correcting the wavelength resolution for a portion of the optical spectrum SP1 for which the wavelength resolution correction method has been selected (step S14: correction step). On the other hand, the corrector 24b performs a process of correcting the shape of the optical spectrum SP1 by expanding or contracting the optical spectrum SP1 in the wavelength axis direction for a portion of the optical spectrum SP1 for which the shape correction method has been selected (step S15: correction step).

Figure 4A:
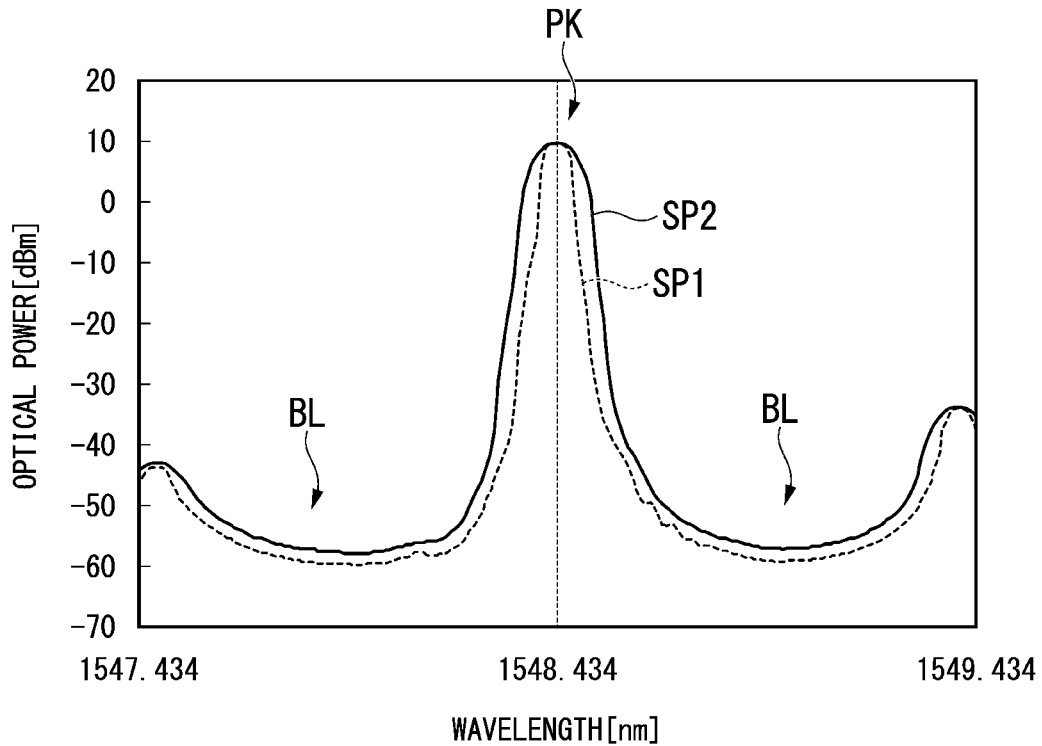
FIG. 4A is a diagram showing an example of optical spectra on which a correction process has been performed in the first embodiment of the present invention.
Figure 4B:
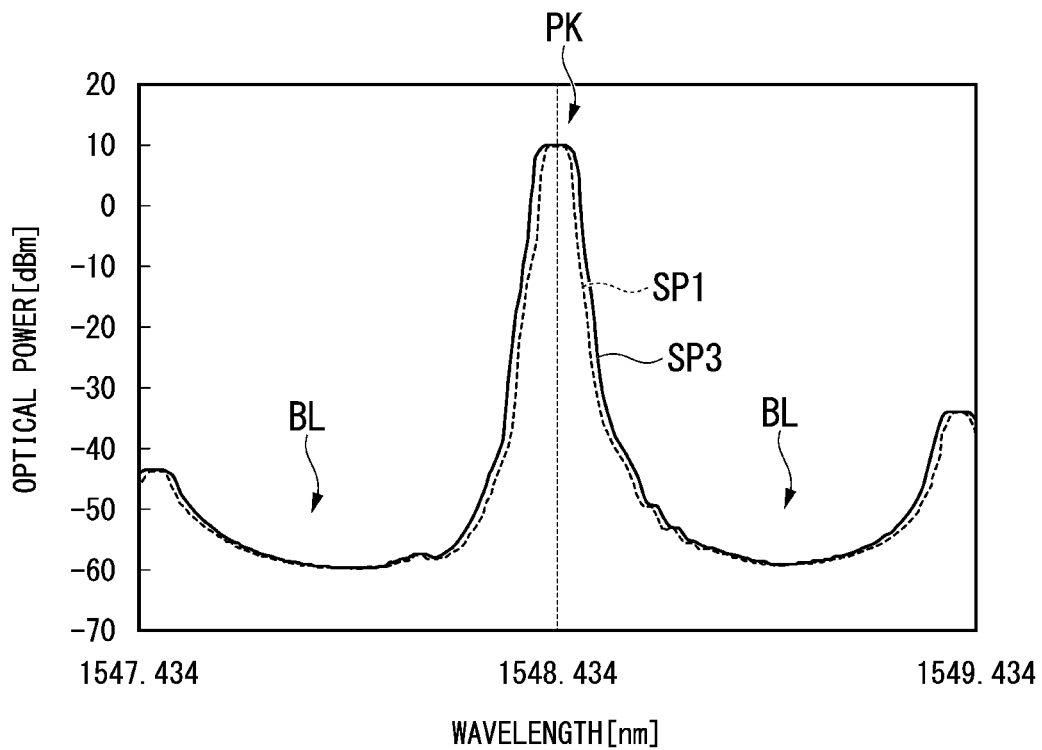
FIG. 4B is a diagram showing an example of optical spectra on which a correction process has been performed in the first embodiment of the present invention.

FIG. 4A and FIG. 4B are diagrams showing an example of optical spectra on which a correction process has been performed in the first embodiment of the present invention. FIG. 4A is a diagram showing optical spectra before and after correction using the wavelength resolution correction method, a light section SP1 is an optical spectrum before correction and an optical spectrum SP2 is an optical spectrum after correction. In the example shown in FIG. 4A, the wavelength resolution (measurement wavelength resolution RB(i)) of the optical spectrum SP1 before correction is set to 0.069 nm. Correction using the wavelength resolution correction method is performed to the optical spectrum SP2 after correction such that the wavelength resolution R thereof becomes 0.1 nm.

The optical spectra SP1 and SP2 shown in FIG. 4A are the same as the optical spectra SP101 and SP102 shown in FIG. A. Accordingly, with respect to the baseline portions BL of the optical spectrum SP2, the optical power of the optical spectrum SP2 after correction is higher than the optical power of the optical spectrum SP1 before correction by 1.6 dB approximately, and correction has been correctly performed. On the other hand, with respect to the peak portion PK of the optical spectrum SP2, the top shape is rounded and widened overall to lead to lack of optical spectrum sharpness.

FIG. 4B is a diagram showing optical spectra before and after correction according to the shape correction method, an optical spectrum SP1 is an optical spectrum before correction and an optical spectrum SP3 is an optical spectrum after correction. In the example shown in FIG. 4B, the wavelength resolution (measurement wavelength resolution RB(i)) of the optical spectrum SP1 before correction is set to 0.069 nm. Correction using the shape correction method is performed to the optical spectrum SP3 after correction such that the wavelength resolution R thereof becomes 0.1 nm. Specifically, shape correction for widening the width of the peak portion PK of the optical spectrum SP1 before correction by a difference between the wavelength resolution (measurement wavelength resolution RB(i)) of the optical spectrum SP1 before correction and the wavelength resolution R of the optical spectrum SP3 after correction is performed.

Figure 5:
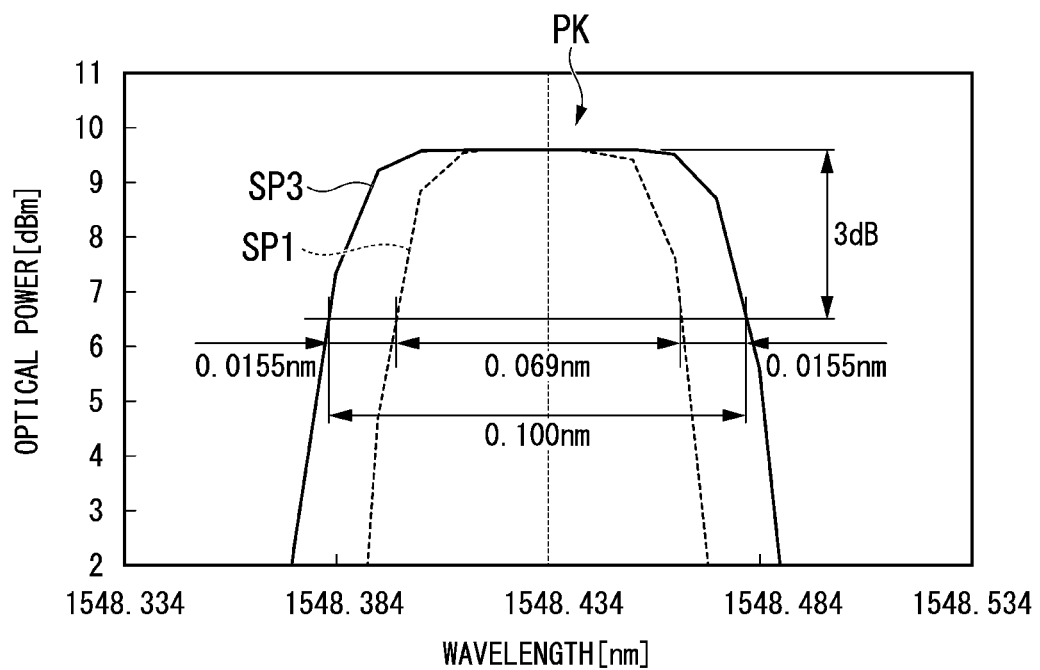
FIG. 5 is an enlarged diagram of a peak portion of an optical spectrum shown in FIG. 4B.

FIG. 5 is an enlarged diagram of the peak portion of the optical spectrum shown in FIG. 4B. To correct the optical spectrum SP1 having the measurement wavelength resolution RB(i) set to 0.069 nm such that the wavelength resolution R becomes 0.1 nm, it is necessary to widen the overall width by 0.031 nm. Accordingly, it is possible to obtain the optical spectrum SP3 having a wavelength resolution R of 0.1 nm by equally widening a short-wavelength side and a long-wavelength side of the peak portion PK by 0.0155 nm.

Here, a method of widening the optical spectrum SP1 may be equally widening the short-wavelength side and the long-wavelength side of the peak portion PK, as described above, or weighting any one of the short-wavelength side and the long-wavelength side of the peak portion PK and widening the short-wavelength side and the long-wavelength side of the peak portion PK. For example, when the measurement wavelength resolution RB(i) of the spectroscope 11 has wavelength dependency, it is desirable to weight any one of the short-wavelength side and the long-wavelength side of the peak portion PK and widen the short-wavelength side and the long-wavelength side of the peak portion PK in consideration of the wavelength dependency.

For example, cases in which a measurement wavelength resolution RB(i) in a main mode has the following wavelength dependency are conceived.

Measurement wavelength resolution having a center wavelength of 1548.434 nm: 0.069 nm Measurement wavelength resolution having a wavelength of 1548.384 nm on a short-wavelength side: 0.070 nm Measurement wavelength resolution having a wavelength of 1548.484 nm on a long-wavelength side: 0.068 nm In this example, since the long-wavelength side has a narrower (higher) measurement wavelength resolution than the short-wavelength side, weighting applied to a widening range is increased by the difference therebetween. For example, weighting may be applied to the long-wavelength side in such a manner that the short-wavelength side becomes 0.015 nm and the long-wavelength side becomes 0.016 nm to widen the overall width by 0.031 nm approximately.

Referring to FIG. 5, it can be ascertained that the peak portion PK of the optical spectrum SP3 has a wavelength resolution of 0.1 nm and the top shape is not rounded. In addition, since the optical spectrum SP1 is expanded in the wavelength axis direction but is not expanded in the optical power axis direction in the shape correction method, the peak power of the optical spectrum SP3 after correction is the same as that before correction. Accordingly, a correct peak power is obtained. On the other hand, the optical power is not corrected in the baseline portions BL of the optical spectrum SP3, as shown in FIG. 4B, and thus a correct optical power is not obtained.

When the above process ends, the synthesizer 24c performs a process of synthesizing the optical spectrum SP2 corrected in step S14 and the optical spectrum SP3 corrected in step S15 (step S16: synthesizing step). For example, the synthesizer 24c performs a process of synthesizing the optical spectrum SP2 corrected in step S14 and the optical spectrum SP3 corrected in step S15 such that a discontinuity does not occur in a synthesized optical spectrum.

Figure 6A:
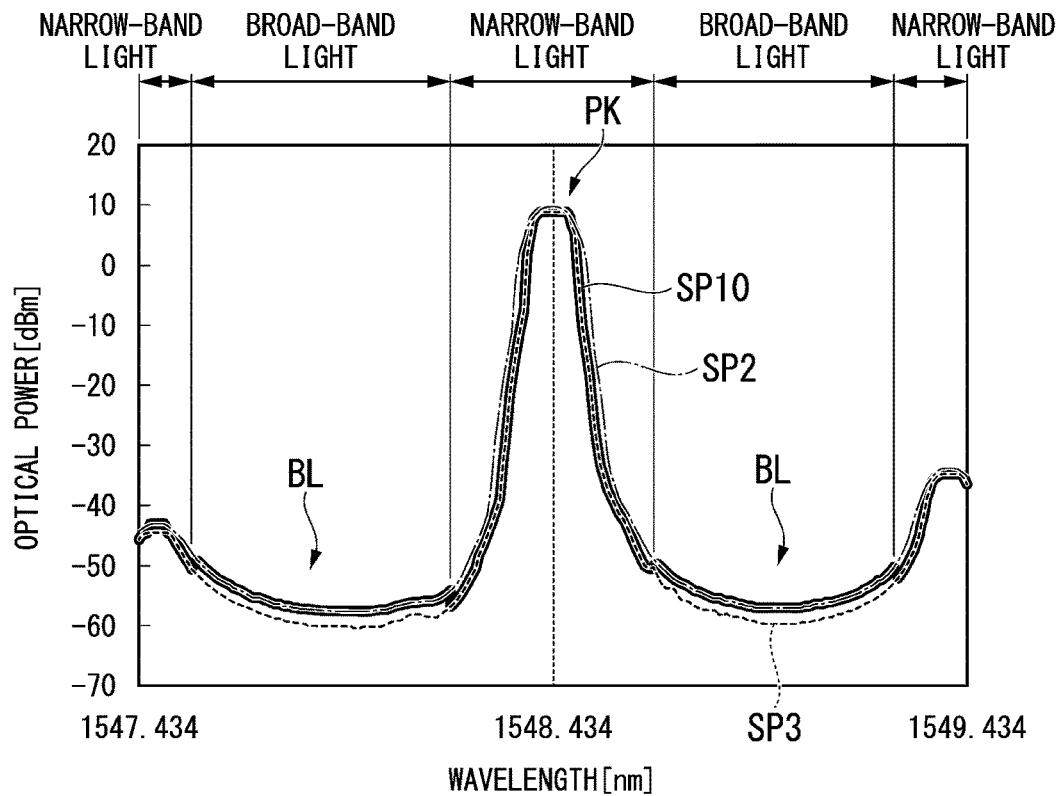
FIG. 6A is a diagram showing an example of optical spectra acquired by a synthesizing process in the first embodiment of the present invention.
Figure 6B:
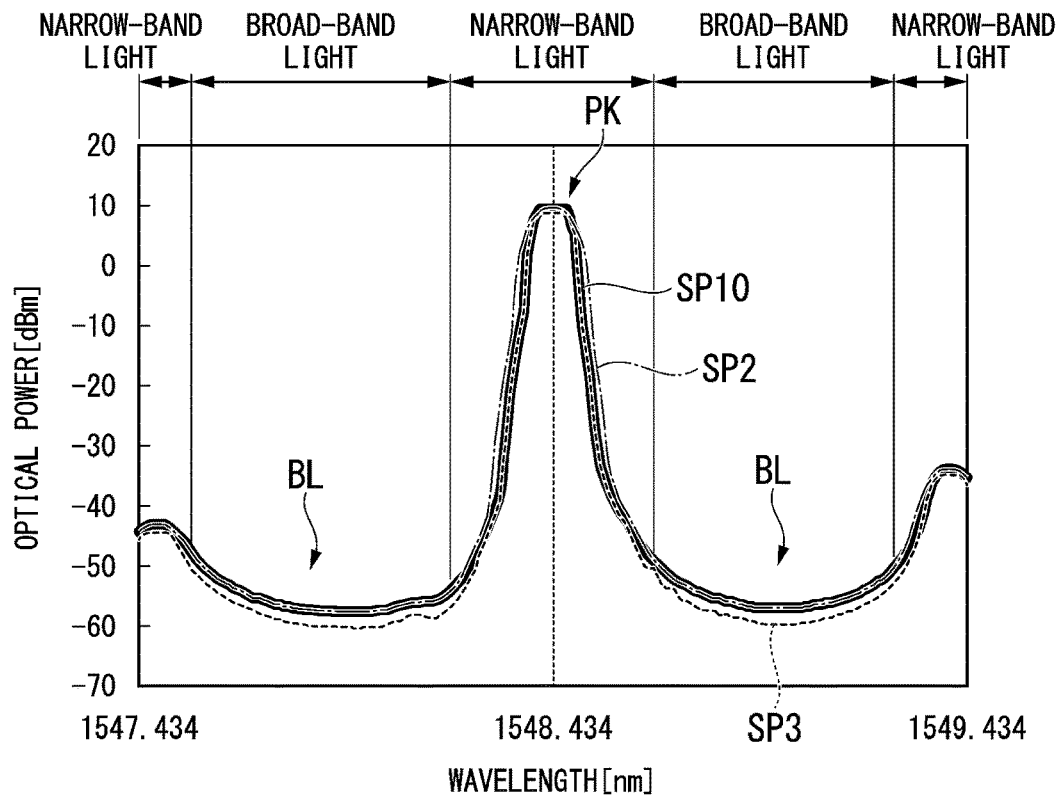
FIG. 6B is a diagram showing an example of optical spectra acquired by a synthesizing process in the first embodiment of the present invention.

FIG. 6A and FIG. 6B are diagrams showing an example of optical spectra acquired by a synthesizing process in the first embodiment of the present invention. As shown in FIG. 6A, the baseline portions BL of the optical spectrum SP2 corrected in step S14 (refer to FIG. 4A) and the peak portion PK of the optical spectrum SP3 corrected in step S15 (refer to FIG. 4B) are synthesized to obtain an optical spectrum SP10. Meanwhile, the baseline portions BL of the optical spectrum SP2 are an optical spectrum of light (broad-band light) having a wider wavelength bandwidth than the wavelength resolution of the spectroscope 11, and the peak portion PK of the optical spectrum SP3 is an optical spectrum of light (narrow-band light) having a narrower wavelength bandwidth than the wavelength resolution of the spectroscope 11.

Referring to FIG. 6A, the synthesized optical spectrum SP10 has the following characteristics. With respect to the baseline portions BL (portion of broad-band light), the optical power is corrected by a widened portion of the wavelength resolution to increase by 1.6 dB approximately. With respect to the peak portion PK (portion of narrow-band light), the shape of the spectrum is corrected such that the wavelength resolution becomes 0.1 nm and the peak power is corrected such that the top portion is not rounded and the peak power is not changed from the peak power before correction.

Here, the optical spectrum SP10 shown in FIG. 6A is obtained by synthesizing the baseline portions BL (portion of broad-band light) and the peak portion PK (portion of narrow-band light) without performing a special process on the boundaries between the baseline portions BL and the peak portion PK. That is, the optical spectrum SP10 is obtained by synthesizing the optical spectra SP2 and SP3 corrected by different correction methods on a short-wavelength side and a long-wavelength side of the boundaries, and thus a discontinuity occurs at the boundary portions and stepped portions appear, as shown in FIG. 6A.

To remove such stepped portions, spectrum data of a portion of narrow-band light may be processed in the optical power axis direction. Here, a method of contracting the spectrum data of the portion of narrow-band light in the optical power axis direction may be conceived such that the peak power is not changed and the optical power is consistent at the boundaries between portions of broad-band light and portions of narrow-band light. Meanwhile, a slope of an optical spectrum in a portion of narrow-band light is appearance of characteristics of the spectroscope 11 and does not represent an actual slope of the optical spectrum of the light L to be measured. Accordingly, even when spectrum data of a portion of narrow-band light is contracted in the optical power axis direction, measurement results do not have an error. By performing such a process, it is possible to remove a stepped portion at the boundary between a portion of broad-band light and a portion of narrow-band light without affecting the peak power of the optical spectrum SP10, as shown in FIG. 6B.

When the above process ends, the signal processor 24 performs a process of outputting corrected spectrum data P1(i) (step S17). For example, the signal processor 24 performs a process of storing the corrected spectrum data P1(i) in the storage 21 or displaying the corrected spectrum data P1(i) through the display 23 as a two-dimensional graph. A series of processes shown in FIG. 2 ends through the above-described procedure.

As described above, in the present embodiment, the shape of an optical spectrum is analyzed using spectrum data obtained by measuring the light L to be measured, a correction process (a correction process using the wavelength resolution correction method or a correction process using the shape correction method) in accordance with the shape of the optical spectrum is performed to the spectrum data based on the analysis result, and corrected spectrum data is synthesized. Accordingly, it is possible to minimize change in shape (rounding or widening) of the peak portion PK of the corrected optical spectrum. As effects, a vicinal dynamic range of the optical spectrum (capability of separately measuring other peak portions adjacent to a certain peak portion of the optical spectrum) can be prevented from deteriorating. Further, the peak power of the optical spectrum before correction can be consistent with that after correction. Accordingly, it is possible to obtain a more accurate optical spectrum than conventional ones.

Second Embodiment

Figure 7:
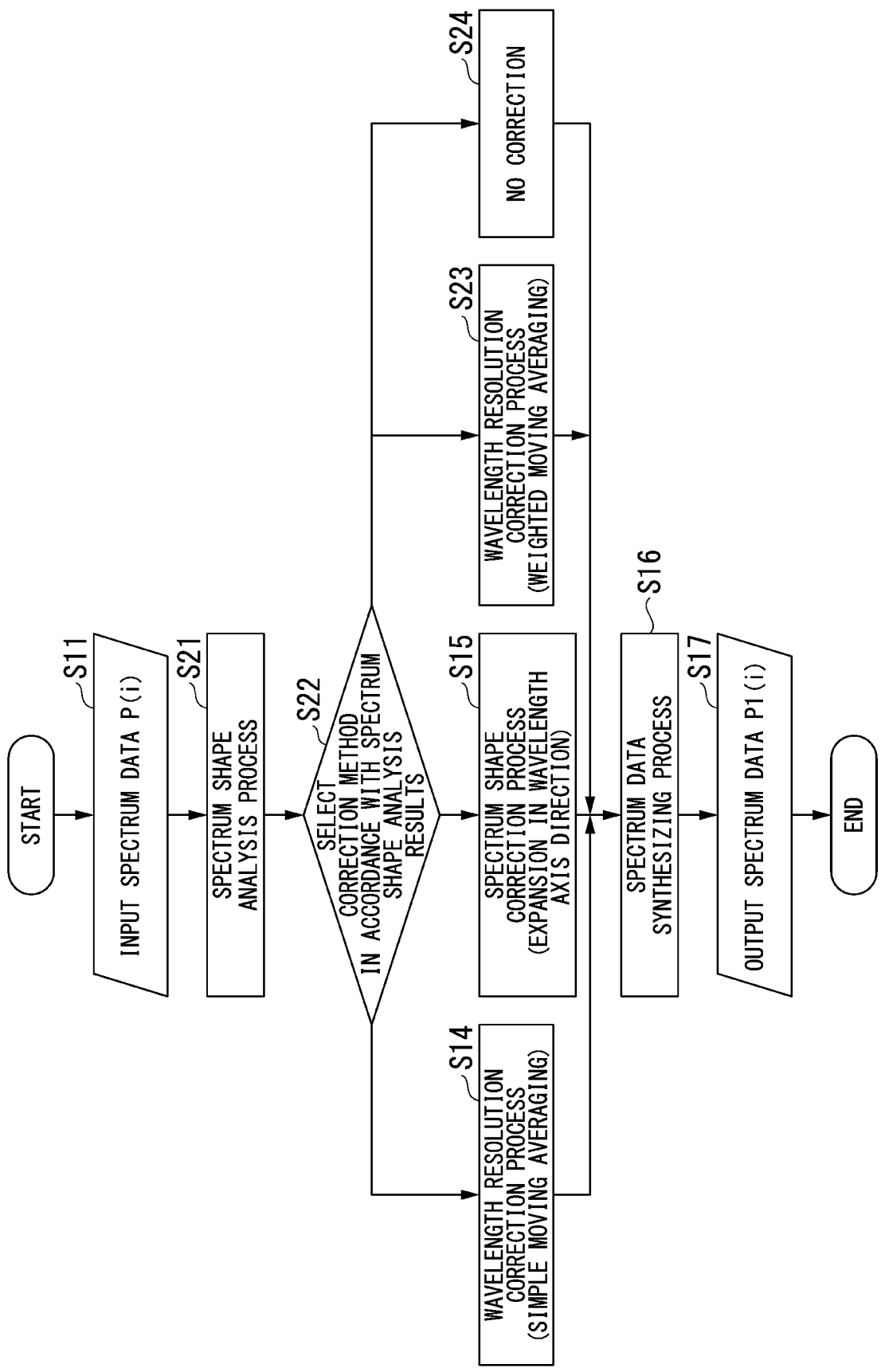
FIG. 7 is a flowchart showing a spectrum correction method according to a second embodiment of the present invention.

FIG. 7 is a flowchart showing a spectrum correction method according to a second embodiment of the present invention. In FIG. 7, steps in which the same processes as those shown in FIG. 2 are performed are represented by the same signs.

The spectrum correction method according to the present embodiment mainly differs from the above-described spectrum correction method according to the first embodiment in that several correction methods for correcting spectrum data are added.

Specifically, the flowchart shown in FIG. 7 differs from the flowchart shown in FIG. 2 in that steps S21 and S22 are provided instead of steps S12 and S13 in FIG. 2 and new steps S23 and S24 are added. Although approximately the same processes as steps S12 and S13 in FIG. 2 are performed in steps S21 and S22, processes different from steps S12 and S13 in FIG. 2 are also performed by adding several correction methods for correcting spectrum data. Processes performed in steps S21 and S22 will be described in detail later.

In step S23, a process is performed using the wavelength resolution correction method for correcting the wavelength resolution of an optical spectrum as in step S14. However, a correction process using simple moving averaging is performed in step S14, whereas a correction process using weighted moving averaging of applying different weights to pieces of spectrum data P(i) and averaging the weighted pieces of spectrum data is performed in step S23. Meanwhile, a method of applying weights to the spectrum data P(i) is arbitrary. Further, step S24 is a step without correction (in which a correction process is omitted).

Furthermore, the spectrum correction method according to the present embodiment includes several correction methods for correcting spectrum data added to the spectrum correction method according to the first embodiment, as described above. Accordingly, the spectrum correction method according to the present embodiment is performed using a spectrum analyzer having the same configuration as that of the optical spectrum analyzer 1 shown in FIG. 1.

When the procedure of the flowchart shown in FIG. 7 starts, first, the signal processor 24 performs a process of inputting spectrum data P(i) as in the first embodiment (step S11). Then, the analyzer 24a performs a process of analyzing the shape of an optical spectrum using the spectrum data P(i) input in step S11 (step S21: analysis step).

Here, a process of obtaining the amount of noise components in each wavelength superposed on the spectrum data P(i) is performed in addition to the process of obtaining a slope amount S(i) that is a change amount of optical power per measurement wavelength resolution RB(i) of the spectrum data P(i), for example. As a method of obtaining the amount of noise components, for example, a method of obtaining a standard deviation (variation) per measurement wavelength resolution RB(i) of the spectrum data P(i) as the amount of noise components can be conceived.

Subsequently, the corrector 24b performs a process of selecting a correction method in accordance with spectrum shape analysis results (step S22). For example, the corrector 24b performs a process of comparing the amount of noise components at each measurement point i with a predetermined threshold value Nth and selecting no correction for a portion at which the amount of noise components exceeds the threshold value Nth. Selection of no correction is for the purpose of preventing a correction process from being performed to a portion having many noises to cause an unnatural optical spectrum.

In addition, for example, the corrector 24b performs a process of comparing the slope amount S(i) at each measurement point i with a plurality of threshold values Sth1 and Sth2 (threshold values set in accordance with characteristics of the spectroscope 11 used for measurement of the light L to be measured) and selecting a correction method described below according to the comparison result. For example, the threshold value Sth1 can be set to 5 dB/RES, and the threshold value Sth2 can be set to 10 dB/RES. In this manner, it is possible to perform spectrum data wavelength resolution correction using the plurality of threshold values Sth1 and Sth2 more flexibly compared to the first embodiment.

When S(i)≤Sth1:
a wavelength resolution correction method using simple moving averaging is selected.

When Sth1<S(i)≤Sth2:
a wavelength resolution correction method using weighted moving averaging is selected.

When Sth2<S(i):
the shape correction method is selected.

Subsequently, the corrector 24b performs a process of correcting a wavelength resolution through simple moving averaging for a portion of the optical spectrum SP1 for which the wavelength resolution correction method using simple moving averaging has been selected (step S14: correction step). In addition, the corrector 24b performs a process of correcting a wavelength resolution through weighted moving averaging for a portion of the optical spectrum SP1 for which the wavelength resolution correction method using weighted moving averaging has been selected (step S23: correction step). Further, the corrector 24b performs a process of correcting the shape of the optical spectrum SP1 by expanding or subtracting the optical spectrum SP1 in the wavelength axis direction for a portion of the optical spectrum SP1 for which the shape correction method has been selected (step S15: correction step). Further, the corrector 24b does not perform a correction process for a portion of the optical spectrum SP1 for which no correction has been selected (step S24).

When the above process ends, the synthesizer 24c performs a process of synthesizing optical spectra that are not corrected in step S24 in addition to optical spectra corrected in steps S14, S15 and S23 S15 (step S16: synthesizing step). Further, it is also desirable to synthesize the aforementioned optical spectra such that a discontinuity does not occur in synthesized optical spectra in the present embodiment.

When the above process ends, the signal processor 24 performs a process of outputting corrected spectrum data P1(i) (step S17). For example, the signal processor 24 performs a process of storing the corrected spectrum data P1(i) in the storage 21 or displaying the corrected spectrum data P1(i) through the display 23 as a two-dimensional graph. A series of processes shown in FIG. 7 ends through the above-described procedure.

As described above, in the present embodiment, the shape of an optical spectrum is analyzed using spectrum data obtained by measuring the light L to be measured, a correction process (a correction process using the wavelength resolution correction method according to simple moving averaging, a correction process using the wavelength resolution correction method according to weighted moving averaging, or a correction process using the shape correction method) in accordance with the shape of the optical spectrum is performed to the spectrum data based on the analysis result, and corrected spectrum data is synthesized. Accordingly, it is possible to minimize change in shape (rounding or widening) of the peak portion PK of the corrected optical spectrum. As effects, a vicinal dynamic range of the optical spectrum (capability of separately measuring other peak portions adjacent to a certain peak portion of the optical spectrum) can be prevented from deteriorating. Further, the peak power of the optical spectrum before correction can be consistent with that after correction. Accordingly, it is possible to obtain a more accurate optical spectrum than conventional ones.

Although the spectrum correction device, the spectrum correction method and the spectrum correction program according to embodiments of the present invention have been described, the present invention is not limited to the above-described embodiments and can be freely modified within the scope of the present invention. For example, although the signal processing device 15 is embedded in the optical spectrum analyzer 1 as a spectrum correction device in the above-described embodiments, the signal processing device 15 may be configured as a separate device that can communicate with the optical spectrum analyzer 1. For example, the signal processing device 15 and the optical spectrum analyzer 1 may communicate with each other through the Internet.

In the spectrum correction device according to one aspect of the present invention, the corrector performs the correction process using a correction method selected from a plurality of correction methods prepared in advance in accordance with the shape of the optical spectrum based on the analysis result of the analyzer.

Further, in the spectrum correction device according to one aspect of the present invention, a first correction method for correcting a wavelength resolution of the optical spectrum and a second correction method for correcting the shape of the optical spectrum by expanding or contracting the optical spectrum in a wavelength axis direction or a frequency axis direction are prepared in the corrector.

Further, in the spectrum correction device according to one aspect of the present invention, the corrector selects the first correction method or the second correction method to perform the correction process in accordance with a slope of the optical spectrum analyzed by the analyzer.

Further, in the spectrum correction device according to one aspect of the present invention, the corrector selects the first correction method to perform the correction process for a portion where the absolute value of the slope of the optical spectrum is equal to or less than a predetermined threshold value Sth, and the corrector selects the second correction method to perform the correction process for a portion where the absolute value of the slope of the optical spectrum is greater than the threshold value.

Further, in the spectrum correction device according to one aspect of the present invention, the corrector performs the correction process in accordance with a result of comparison between an absolute value of the slope of the optical spectrum and a plurality of predetermined threshold values Sth1 and Sth2, using a correction method selected from a plurality of correction methods prepared in advance in accordance with the shape of the optical spectrum.

Further, in the spectrum correction device according to one aspect of the present invention, the threshold value is set in accordance with characteristics of a spectroscope used for measurement of the light to be measured.

Further, in the spectrum correction device according to one aspect of the present invention, the synthesizer synthesizes the spectrum data corrected by the corrector so that a discontinuity does not occur in the optical spectrum after synthesizing.

Further, in the spectrum correction device according to one aspect of the present invention, the synthesizer processes at least a part of the spectrum data corrected by the corrector in an optical power axis direction so that the discontinuity does not occur.

Further, in the spectrum correction device according to one aspect of the present invention, the corrector performs the correction process using a correction method selected from a plurality of correction methods prepared in advance in accordance with an amount of noise components superposed on the optical spectrum analyzed by the analyzer.

A spectrum correction method according to one aspect of the present invention includes an analysis step S12 and S21 of analyzing a shape of an optical spectrum obtained by measuring a light L to be measured using spectrum data representing the optical spectrum, a correction step S14, S15 and S23 of performing a correction process according to the shape of the optical spectrum to the spectrum data based on an analysis result of the analysis step, and a synthesizing step S16 of synthesizing the spectrum data corrected in the correction step.

A spectrum correction program according to one aspect of the present invention causes a computer to function as an analysis means 24a for analyzing a shape of an optical spectrum obtained by measuring a light L to be measured using spectrum data representing the optical spectrum, a correction means 24b for performing a correction process according to the shape of the optical spectrum on the spectrum data based on an analysis result of the analysis means, and a synthesizing means 24c for synthesizing the spectrum data corrected by the correction means.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A spectrum correction device comprising:
    a hardware processor configured to execute a program stored in a storage to implement:
        an analyzer configured to analyze a shape of an optical spectrum obtained by measuring a light to be measured using spectrum data representing the optical spectrum;

a corrector configured to perform a correction process according to the shape of the optical spectrum to the spectrum data based on an analysis result of the analyzer; and a synthesizer configured to synthesize the spectrum data corrected by the corrector, wherein the corrector is configured to perform the correction process using a correction method selected from a plurality of correction methods prepared in advance in accordance with the shape of the optical spectrum based on the analysis result of the analyzer.

2. The spectrum correction device according to claim 1, wherein a first correction method for correcting a wavelength resolution of the optical spectrum and a second correction method for correcting the shape of the optical spectrum by expanding or contracting the optical spectrum in a wavelength axis direction or a frequency axis direction are prepared in the corrector.

3. The spectrum correction device according to claim 2, wherein the corrector is configured to select the first correction method or the second correction method to perform the correction process in accordance with a slope of the optical spectrum analyzed by the analyzer.

4. The spectrum correction device according to claim 3, wherein the corrector is configured to select the first correction method to perform the correction process for a portion where an absolute value of the slope of the optical spectrum is equal to or less than a predetermined threshold value, and wherein the corrector is configured to select the second correction method to perform the correction process for a portion where the absolute value of the slope of the optical spectrum is greater than the threshold value.

5. The spectrum correction device according to claim 4, wherein the threshold value is set in accordance with characteristics of a spectroscope used for measurement of the light to be measured.

6. The spectrum correction device according to claim 1, wherein the corrector is configured to perform the correction process in accordance with a result of comparison between an absolute value of the slope of the optical spectrum and a plurality of predetermined threshold values, using a correction method selected from a plurality of correction methods prepared in advance in accordance with the shape of the optical spectrum.

7. The spectrum correction device according to claim 1, wherein the corrector is configured to perform the correction process using a correction method selected from a plurality of correction methods prepared in advance in accordance with an amount of noise components superposed on the optical spectrum analyzed by the analyzer.

8. A spectrum correction device comprising:
a hardware processor configured to execute a program stored in a storage to implement:
an analyzer configured to analyze a shape of an optical spectrum obtained by measuring a light to be measured using spectrum data representing the optical spectrum;
a corrector configured to perform a correction process according to the shape of the optical spectrum to the spectrum data based on an analysis result of the analyzer; and
a synthesizer configured to synthesize the spectrum data corrected by the corrector, wherein the synthesizer is configured to synthesize the spectrum data corrected by the corrector so that a discontinuity does not occur in the optical spectrum after synthesizing.

9. The spectrum correction device according to claim 8, wherein the synthesizer is configured to process at least a part of the spectrum data corrected by the corrector in an optical power axis direction so that the discontinuity does not occur.

10. A spectrum correction method comprising:
analyzing, by an analyzer, a shape of an optical spectrum obtained by measuring a light to be measured using spectrum data representing the optical spectrum;
performing, by a corrector, a correction process according to the shape of the optical spectrum to the spectrum data based on an analysis result of the analyzer;
synthesizing, by a synthesizer, the spectrum data corrected by the corrector; and
performing, by the corrector, the correction process using a correction method selected from a plurality of correction methods prepared in advance in accordance with the shape of the optical spectrum based on the analysis result of the analyzer.

11. The spectrum correction method according to claim 10,
wherein a first correction method for correcting a wavelength resolution of the optical spectrum and a second correction method for correcting the shape of the optical spectrum by expanding or contracting the optical spectrum in a wavelength axis direction or a frequency axis direction are prepared in the corrector.

12. The spectrum correction method according to claim 11, further comprising:
selecting, by the corrector, the first correction method or the second correction method to perform the correction process in accordance with a slope of the optical spectrum analyzed by the analyzer.

13. The spectrum correction method according to claim 12, further comprising:
selecting, by the corrector, the first correction method to perform the correction process for a portion where an absolute value of the slope of the optical spectrum is equal to or less than a predetermined threshold value; and
selecting, by the corrector, the second correction method to perform the correction process for a portion where the absolute value of the slope of the optical spectrum is greater than the threshold value.

14. The spectrum correction method according to claim 13,
wherein the threshold value is set in accordance with characteristics of a spectroscope used for measurement of the light to be measured.

15. The spectrum correction method according to claim 10, further comprising:
performing, by the corrector, the correction process in accordance with a result of comparison between an absolute value of the slope of the optical spectrum and a plurality of predetermined threshold values, using a correction method selected from a plurality of correction methods prepared in advance in accordance with the shape of the optical spectrum.

16. A spectrum correction method comprising:
analyzing, by an analyzer, a shape of an optical spectrum obtained by measuring a light to be measured using spectrum data representing the optical spectrum;

performing, by a corrector, a correction process according to the shape of the optical spectrum to the spectrum data based on an analysis result of the analyzer;

synthesizing, by a synthesizer, the spectrum data corrected by the corrector; and synthesizing, by the synthesizer, the spectrum data corrected by the corrector so that a discontinuity does not occur in the optical spectrum after synthesizing.

17. The spectrum correction method according to claim 16, further comprising:

processing, by the synthesizer, at least a part of the spectrum data corrected by the corrector in an optical power axis direction so that the discontinuity does not occur.

18. A non-transitory computer readable storage medium storing one or more spectrum correction programs configured for execution by a computer, the one or more spectrum correction programs comprising instructions for:

analyzing, by an analyzer, a shape of an optical spectrum obtained by measuring a light to be measured using spectrum data representing the optical spectrum;

performing, by a corrector, a correction process according to the shape of the optical spectrum to the spectrum data based on an analysis result of the analyzer;

synthesizing, by a synthesizer, the spectrum data corrected by the corrector; and performing, by the corrector, the correction process using a correction method selected from a plurality of correction methods prepared in advance in accordance with the shape of the optical spectrum based on the analysis result of the analyzer.

19. A non-transitory computer readable storage medium storing one or more spectrum correction programs configured for execution by a computer, the one or more spectrum correction programs comprising instructions for:

analyzing, by an analyzer, a shape of an optical spectrum obtained by measuring a light to be measured using spectrum data representing the optical spectrum;

performing, by a corrector, a correction process according to the shape of the optical spectrum to the spectrum data based on an analysis result of the analyzer;

synthesizing, by a synthesizer, the spectrum data corrected by the corrector; and synthesizing, by the synthesizer, the spectrum data corrected by the corrector so that a discontinuity does not occur in the optical spectrum after synthesizing.

* * * * *